United States Patent
Chen

(10) Patent No.: US 8,744,797 B2
(45) Date of Patent: Jun. 3, 2014

(54) TEST SYSTEM AND TEST METHOD THEREOF

(75) Inventor: Chun-Chen Chen, Taipei (TW)

(73) Assignee: Quanta Computer Inc., Tao Yuan Shien (TW)

( * ) Notice: Subject to any disclaimer, the term of this patent is extended or adjusted under 35 U.S.C. 154(b) by 1183 days.

(21) Appl. No.: 12/684,701

(22) Filed: Jan. 8, 2010

(65) Prior Publication Data
US 2011/0029814 A1   Feb. 3, 2011

(30) Foreign Application Priority Data
Jul. 31, 2009   (TW) ................................. 98125992 A

(51) Int. Cl.
*G01R 31/00* (2006.01)

(52) U.S. Cl.
USPC ....................................................... 702/120

(58) Field of Classification Search
CPC .............. G01R 31/319; G06F 11/0766; G06F 17/3074; H04N 17/004
USPC .................. 702/108, 117–123, 126, 183, 185
See application file for complete search history.

(56) References Cited

U.S. PATENT DOCUMENTS

2009/0013372 A1 *   1/2009   Oakes et al. ................... 725/139

FOREIGN PATENT DOCUMENTS

| CN | 1641593 A | 7/2005 |
|---|---|---|
| CN | 201014962 Y | 1/2008 |
| CN | 101453664 A | 6/2009 |

* cited by examiner

*Primary Examiner* — Mohamed Charioui
(74) *Attorney, Agent, or Firm* — Rabin & Berdo, P.C.

(57) ABSTRACT

A test system and a test method thereof. The test system includes an electronic device and a test device. The electronic device includes a plurality of output interfaces and provides a corresponding test signal via the output interfaces according to a group of operation commands. The test device includes a transforming unit, a multiplexer unit, a processor unit and a plurality of test interfaces which are respectively coupled to the output interfaces. The transforming unit transforms the test signals received via the test interfaces. The multiplexer unit selects the transformed test signals. The processor unit controls the multiplexer unit to select one of the transformed test signals, and determines whether the transformed test signal being selected conforms a predetermine condition for generating a test result signal. The processor unit controls the communication unit to transmit the test result signal to the electronic device according to the test result signal.

16 Claims, 4 Drawing Sheets

TEST SYSTEM AND TEST METHOD THEREOF

This application claims the benefit of Taiwan application Serial No. 98125992, filed Jul. 31, 2009, the subject matter of which is incorporated herein by reference.

BACKGROUND OF THE INVENTION

1. Field of the Invention

The invention relates in general to a test system and a test method thereof, and more particularly to a test system and a test method thereof for testing a plurality of output interfaces of an electronic device automatically.

2. Description of the Related Art

With the rapid advance in science and technology, many electronic devices used in everyday life are developed. The electronic device, such as a notebook computer which supports a plurality of output interfaces to satisfy consumers' needs in terms of audio and video quality. The output interfaces support one of video graphics array (VGA) interface protocol, high definition multimedia interface (HDMI) protocol, S-video, display port, Sony/Philips digital interface (S/PDIF) or audio line out.

Before the electronic device is delivered from the factory, the test personnel test the output interfaces of the electronic device artificially. Firstly, the test personnel couples the test device (such as an earphone) to a corresponding output interface (such as support audio line out protocol), and further uses the electronic device to output a test signal (such as a sound signal). Afterwards, the test personnel determine whether the output interface is normal by hearing with the earphone artificially. Normally, the electronic device has a plurality of output interfaces. However, the above method of testing the electronic device artificially may result in inaccuracy due to artificial operation, and is both time consuming and labor consuming.

SUMMARY OF THE INVENTION

The invention is directed to a test system and a test method thereof. According to an embodiment of the invention, the test system includes an electronic device and a test device. The electronic device includes a plurality of output interfaces. The test device includes a plurality of test interfaces and a processor unit. The electronic device provides a corresponding test signal via a plurality of output interfaces which are corresponding and coupled to the test interfaces. The processor unit determines whether the test signals conforms a group of predetermine conditions via the test signal received by the test interfaces to determine whether the output interfaces corresponding to the test signals are normal. Thus, the output interfaces can be tested in an automatic way to save the test time and reduce the labor power so that the error caused by artificial judgment is avoided and the accuracy of test is improved.

According to a first aspect of the present invention, a test system is provided. The test system includes an electronic device and a test device. The electronic device includes a plurality of output interfaces and provides a corresponding test signal via the output interfaces according to a group of operation commands. The test device includes a transforming unit, a multiplexer unit, a processor unit and a plurality of test interfaces respectively coupled to the output interfaces. The transforming unit transforms the test signals received via the test interfaces. The multiplexer unit selects the transformed test signals. The processor unit controls the multiplexer unit to select one of the transformed test signals according to the group of operation commands, and determines whether the transformed test signal being selected conforms a predetermine condition for generating a test result signal. The processor unit controls the communication unit to transmit the test result signal to the electronic device according to the test result signal.

According to a second aspect of the present invention, a test method applicable to a test system is provided. The test system includes an electronic device and a test device. The electronic device includes a plurality of output interfaces. The test device includes a plurality of test interfaces respectively coupled to the output interfaces. The method includes the following steps. Firstly, the electronic device provides a corresponding test signal via the output interfaces according to a group of operation commands. Next, the test device transforms the test signals received via the test interfaces. Afterwards, the test device controls a multiplexer unit to select one of the transformed test signals according to the group of operation commands. Next, the test device determines whether the transformed test signal being selected conforms a predetermine condition for generating a test result signal. Lastly, the test device controls a communication unit to transmit the test result signal to the electronic device.

The invention will become apparent from the following detailed description of the preferred but non-limiting embodiments. The following description is made with reference to the accompanying drawings.

DETAILED DESCRIPTION OF THE INVENTION

Figure 1:
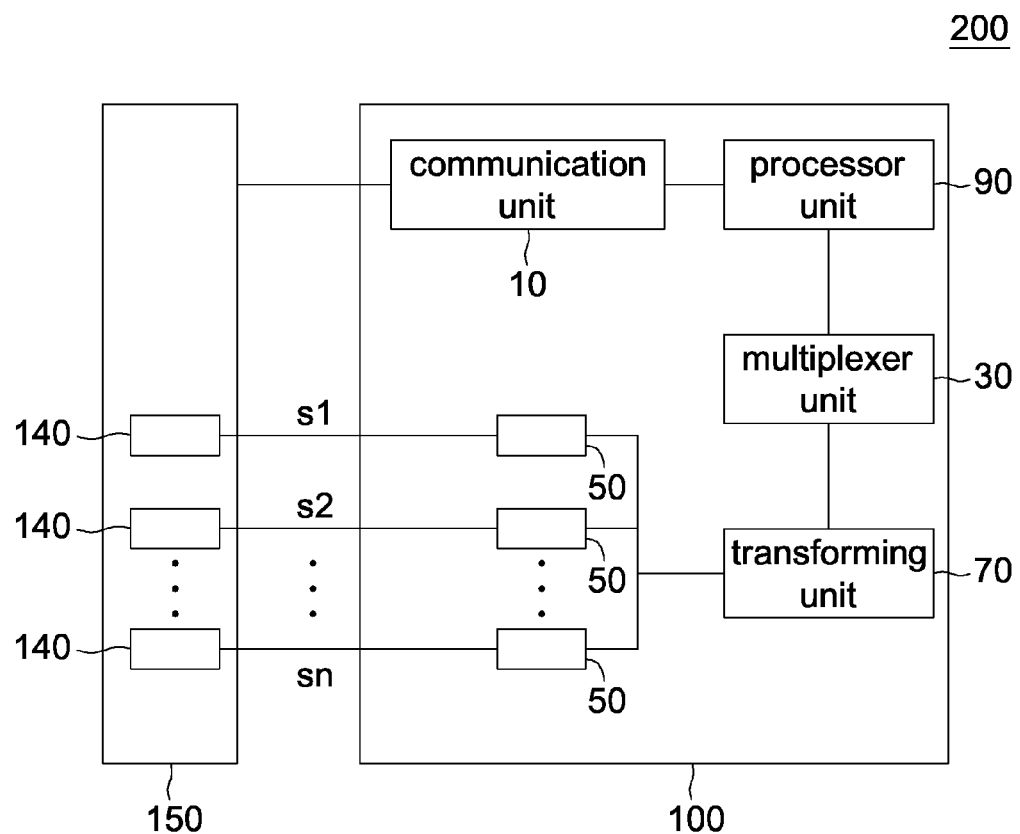
FIG. 1 shows a block diagram of a test system according to an embodiment of the invention.

Referring to FIG. 1, a block diagram of a test system according to an embodiment of the invention is shown. As shown in FIG. 1, the test system 200 includes an electronic device 150 and a test device 100. The electronic device 150 includes a plurality of output interfaces 140. The electronic device is, for example, a notebook computer or other electronic device with a plurality of output interfaces. The test device 100 includes a communication unit 10, a multiplexer unit 30, a plurality of test interfaces 50, a transforming unit 70 and a processor unit 90.

The electronic device 150, for example, provides a corresponding test signal s1~sn via a plurality of output interfaces 150 according to a group of operation commands. The several test interfaces 50 are respectively coupled to the output interfaces 140. The transforming unit 70 transforms the several test signals received via the test interfaces 50. The processor unit 90 controls the multiplexer unit 30 to select one of the transformed test signals according to a group of operation commands, and determines whether the transformed test signal being selected conforms a predetermine condition for generating a test result signal. The processor unit 90 further controls the communication unit 10 to transmit the test result signal to the electronic device 150.

Figure 2:
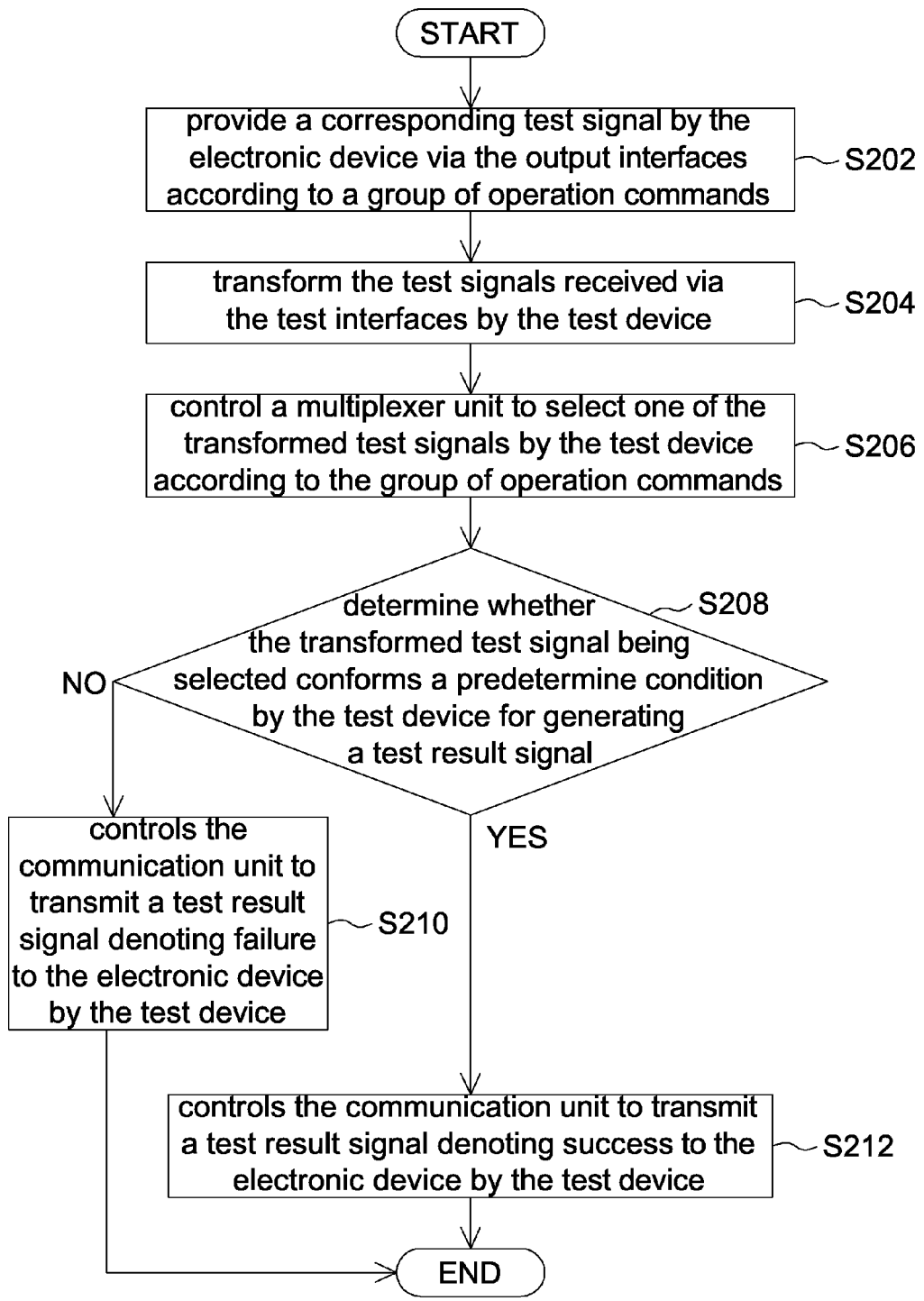
FIG. 2 a flowchart of a test method used in the test system of FIG. 1.
Figure 3:
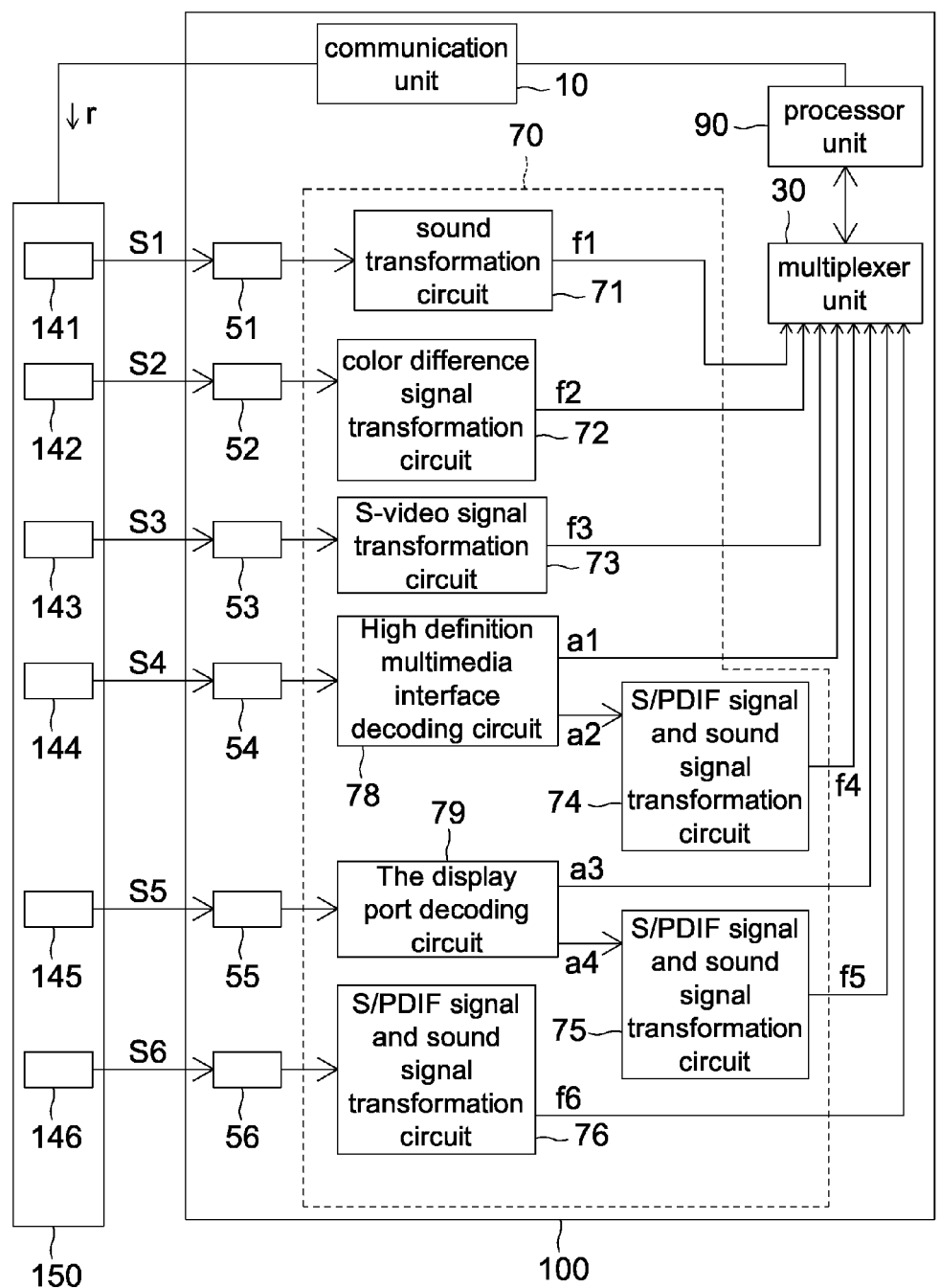
FIG. 3 shows a detailed block diagram of the test system of FIG. 1.

Referring to FIGS. 2 and 3. FIG. 2 shows a flowchart of a test method used in the test system of FIG. 1. FIG. 3 shows a detailed block diagram of the test system of FIG. 1. Firstly, the method begins at step S202, the electronic device 150 provides a corresponding test signal via a plurality of test interfaces 50 according to a group of operation commands. The output interfaces 140 are output interfaces 141~146 for example, and the test interfaces 50 are test interfaces 51~56 for example. The test interfaces 51~56 are respectively corresponding and coupled to the output interfaces 141~146. The test interfaces 51~56 and the output interfaces 141~146 respectively coupled to the test interfaces respectively support one of audio line out standard, video graphics array (VGA) interface standard, high definition multimedia interface (HDMI) standard, S-video standard, display port standard, Sony/Philips digital interface (S/PDIF) standard. The group of operation commands is exemplified in an example below.

For example, the group of operation commands includes the several operation commands, and the electronic device 150 provides a corresponding test signal according to each operation command. The electronic device further transmits the operation commands to the test device 100. Presumably, the electronic device 150, according to one of the group of operation commands, provides a test signal s1 via the output interfaces 141 supporting audio line out. The test signal s1 includes the sound signal of the left and the right sound track supporting audio line out. Thus, the group of operation commands can design and adjust the type of the signal provided by the electronic device according to each output interface of the electronic device. The test personnel can further set the sequence of the operation commands of the group of operation commands.

Furthermore, the electronic device 150 respectively provides the test signals s2~s6 via the output interfaces 142~146 according to each operation command of the group of operation commands. The output interfaces 142~146 and the test interfaces 52~56 respectively coupled to the output interfaces respectively support VGA interface standard, S-video standard, HDMI standard, display port and S/PDIF standard.

Next, the test signal s2, for example, includes a horizontal synchronisation signal (Hsync), a vertical synchronisation signal (Vsync), and a RGB color difference signal. The test signal s3 includes a brightness signal and a chromaticity signal. The test signal s4 and the test signal s5, for example, respectively include an S/PDIF sound signal, a horizontal synchronisation signal and a vertical synchronisation signal. The test signal s6, for example, includes an S/PDIF sound signal.

Next, the present embodiment of the invention proceeds to step S204. In step S204, the transforming unit 70 transforms the test signal received via a plurality of test interfaces. The transforming unit 70, for example, includes a sound signal transformation circuit 71, a color difference signal transformation circuit 72, an S-video signal transformation circuit 73, three S/PDIF signal and sound signal transformation circuits 74~76, a digital/analog transformation circuit 77, a high definition multimedia interface (HDMI) decoding circuit 78 and a display port decoding circuit 79. How the transforming unit transforms the test signal is exemplified below.

For example, the sound signal transformation circuit 71, the color difference signal transformation circuit 72 and the S-video signal transformation circuit 73 are respectively corresponding to the test interfaces 51~53, and are respectively used for transforming the test signals s1~s3 and outputting the transformed test signals f1~f3. In an example, the sound transformation circuit 71, the color difference signal transformation circuit 72, the S-video signal transformation circuit 73, for example, transform the test signals s1~s3 into transistor-transistor logic (TTL) signals. The test signal s1 is a sine-wave signal for example, and the transformed test signal f1 is a TTL signal for example.

The HDMI decoding circuit 78, for example, decodes a test signal s4 to obtain a horizontal and vertical synchronisation signal a1 and an S/PDIF sound signal a2 which are included in the test signal s4. The S/PDIF signal and sound signal transformation circuit 74 transforms the sound signal having the S/PDIF standard a2 into a TTL signal f4 from the test signal s4. In an example, the S/PDIF signal and sound signal transformation circuit 74 transforms sound signal a2 having the S/PDIF standard into an analog sound signal first, and then the analog sound signal is transformed into a TTL signal.

The display port decoding circuit 79, for example, decodes a test signal s5 via the test interfaces 55 to obtain a horizontal and vertical synchronisation signal a3, and a sound signal having the S/PDIF standard a4 which are included in the test signal s5. The S/PDIF signal and sound signal transformation circuit 75 transforms the sound signal a3 having the S/PDIF standard into a TTL signal f5 from the test signal s5. In an example, the S/PDIF signal and sound signal transformation circuit 75 transforms sound signal a4 having the S/PDIF standard into an analog sound signal first, and then transforms the analog sound signal into a TTL signal.

Afterwards, the method proceeds to step S206. In step S206, the processor unit 90 controls the multiplexer unit 30 to select one of a plurality of the transformed test signal according to the group of operation commands. The processor unit 90, for example, obtains the group of operation commands by the communication unit 10. Presumably, the electronic device 150 provides a test signal s1 according to an operation command, and the processor unit 90 controls the multiplexer unit 30 to select the transformed test signal f1 according to the operation command. The communication unit 10 supports radio standard (RS-232) or universal serial bus (USB).

In step S208, the processor unit 90 determines whether the transformed test signal conforms a predetermine condition to provide a test result signal. If the transformed test signal does not conform the predetermine condition, then step S210 is performed. If the transformed test signal conforms the predetermine condition, then step S212 is performed. The processor unit 90 determines whether the pulse count of the transformed test signal conforms the predetermine condition within a predetermined time by the pulse counting method for example. The details of the pulse counting method are exemplified below.

Figure 4:
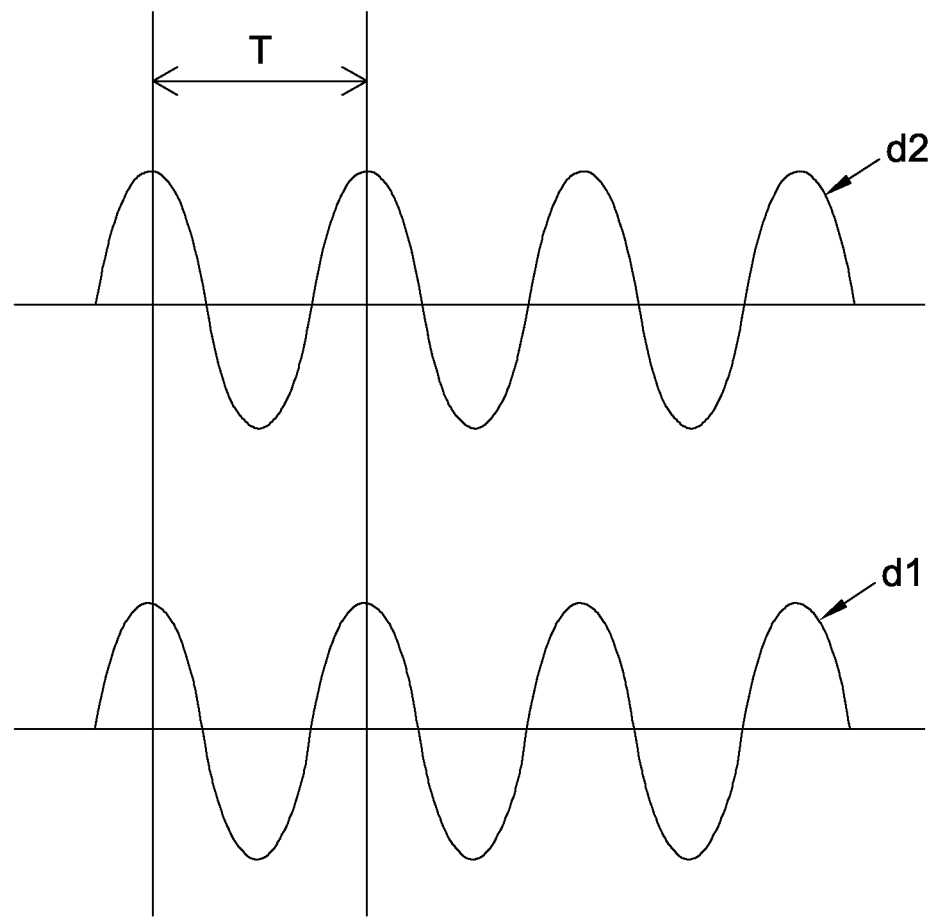
FIG. 4 shows a wave pattern of the signals of the left and the right sound track of the test system of FIG. 1.

For example, the processor unit 90 determines whether the transformed test signal f1 conforms a predetermine condition, and the specification (such as period, frequency) of the test signal s1 corresponding to the transformed test signal f1 is predetermined in the electronic device 150 and the test device 100. FIG. 4 shows a waveform the signals of the left and the right sound track of the test system of FIG. 1. The periods T of the left sound track signal d1 and the right sound track signal d2 are 1 ms for example. When a predetermined time is set as 9.5 ms, the processor unit 90 determines whether the pulse count of the transformed test signal f1, which passes through the output interface 141 and is transformed by the sound transformation circuit 71 within the predetermined time, conforms the predetermine condition.

The predetermine condition can be set as below: 9 pulse count that should be received by the processor unit 90 after 9.5 ms of the time. If the pulse count of the transformed test signal f1 within a predetermine time (9.5 ms) is 9, then the test signal s1 is correct and the output interface 141 corresponding to the test signal s1 is normal. However, the above predetermined time and predetermine condition can be adjusted and designed according to the test signal, and are not limited to be above exemplification.

In another example, a period of the vertical synchronisation signal of the test signal s2 is 16.67 ms for example, and the predetermined time can be set as 42 ms (that is, (16.67 ms*2+16.67 ms*3) /2). Meanwhile, the processor unit 90 determines whether the pulse count of the vertical synchronisation signal of the transformed test signal f2 within 42 ms of the time is 2. Besides, when the processor unit 90 recognizes the RGB color difference signal of the test signal s2 by the pulse counting method, calculation errors may occur when the output interface 52 supporting VGA does not the output RGB signal within the vertical blanking period.

The predetermined time corresponding to RGB color difference signal can be set to be greater than 1 vertical synchronisation signal period plus 2 [0]vertical blanking period. For example, the output interface of the electronic device, which supports VGA, outputs a frame, which is in 1024×768 resolution mode and blanking, the processor unit 90 determines whether the pulse count of the RGB color difference signal is at least 768 (for example, there are at least 768 horizontal scan lines in any two vertical synchronisation periods) within the predetermined time of 20 ms (the vertical blanking period is normally smaller than 1 ms) for avoiding an influence by the vertical blanking period for the pulse counting method. However, in other examples, the processor unit 90 can determine whether other test signals are correct by using the same method, and the details are not repeated here.

In step S210, the processor unit 90 controls the communication unit 10 to transmit the test result signal denoting failure to the electronic device 150. In step S212, the processor unit 90 controls the communication unit 10 to transmit the test result signal denoting success to the electronic device 150.

Furthermore, the electronic device 150, for example, further includes a display unit (not illustrated). If the test result signal denotes test being successful, then the electronic device 150 displays the test result signal denoting success by the display unit. In an example, after providing a test signal s1 corresponding to the output interface 141, the electronic device 150, for example, further determines whether to continue providing another test signal according to the test result signal transmitted from the test device 100. If the test result signal denotes test being successful, then the electronic device 150 continues to provide a test signal s2 corresponding to the output interface 142 and continues to wait a result signal transmitted from test device 100 for continuing to do the testing. If the test result signal denotes test being failed, then the electronic device 150 displays the test result signal denoting test being failed by the display unit (not illustrated) to inform the test personnel which output interface may have problem so that they can stop subsequent testing.

Thus, the present embodiment of the invention allows the test personnel to perform automatic testing to a plurality of output interfaces of the electronic device to avoid possible man-made errors caused by the test personnel and save the test personnel's time spent in testing.

The test system and the test method thereof disclosed in the above embodiments of the invention have many advantages exemplified below:

(1) One of the foregoing embodiments allows the test personnel to determine whether the output interface is normal in an automatic method, hence avoiding man-caused errors and assuring test accuracy.

(2) The automatic method of testing a plurality of output interfaces of the electronic device replaces the conventional artificial method, not only saving labor cost but also spending less test time.

(3) One of the foregoing embodiments further allows the test personnel to flexibly design the operation command and predetermined conditions according to the number of the output interface of the electronic device so as to have a wider range of application.

Compared with the generally known artificial method for testing the output interfaces, the above embodiments of the invention have higher applicability, convenience and accuracy and enable the test personnel to obtain test results with high accuracy more promptly and labor-saving.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A test system, comprising:
   an electronic device comprising a plurality of output interfaces, wherein the electronic device provides a corresponding test signal via the output interfaces according to a group of operation commands;
   a test device, comprising:
      a communication unit;
      a plurality of test interfaces respectively coupled to the output interfaces;
      a transforming unit including a plurality of transformation circuits for transforming the test signals received via the test interfaces, respectively;
      a multiplexer unit coupled to the transformation circuits, for selecting one among the transformed test signals from the transformation circuits; and
      a processor unit for controlling the multiplexer unit to select one of the transformed test signals according to the group of operation commands, and further determining whether a pulse count of the transformed test signal being selected within a predetermined time conforms a predetermine condition for generating a test result signal, wherein the processor unit further controls the communication unit to transmit the test result signal to the electronic device.

2. The test system according to claim 1, wherein the transformation circuits respectively correspond to the test signals.

3. The test system according to claim 2, wherein the transforming unit further comprises:
   a plurality of decoding circuits for decoding at least one of the pre-transformed test signals.

4. The test system according to claim 1, wherein the test signal is an analog signal, and the transformed test signal is a transistor-transistor logic (TTL) signal.

5. The test system according to claim 1, wherein the processor controls the communication unit to transmit the test result signal denoting failure to the electronic device if the transformed test signal does not conform the predetermine condition, and the processor unit controls the communication unit to transmit the test result signal denoting success to the electronic device if the transformed test signal conforms the predetermine condition.

6. The test system according to claim 1, wherein the test interfaces and the output interfaces respectively coupled to the test interfaces respectively support one of video graphics array (VGA) interface, high definition multimedia interface (HDMI) standard, S-video standard, display port standard, Sony/Philips digital interface (S/PDIF) standard, and audio line out standard.

7. The test system according to claim 1, wherein the communication unit supports one of radio standard (RS-232) and universal serial bus (USB).

8. The test system according to claim 1, wherein the electronic device further determines whether to continue providing a test signal according to the test result signal.

9. A test method adapted to a test system comprising an electronic device and a test device, wherein the electronic device comprises a plurality of output interfaces, the test device comprises a plurality of test interfaces respectively coupled to the output interfaces, and the method comprises:
 providing a corresponding test signal by the electronic device via the output interfaces according to a group of operation commands;
 transforming the test signals received via the test interfaces by a plurality of transformation circuits of the test device;
 controlling a multiplexer unit, coupled to the transformation circuits, to select one of the transformed test signals from the transformation circuits of the test device according to the group of operation commands;
 determining whether a pulse count of the transformed test signal being selected within a pre-determined time conforms a predetermine condition by the test device for generating a test result signal; and
 controlling a communication unit to transmit the test result signal to the electronic device by the test device according to the test result signal.

10. The test method according to claim 9, comprising:
 respectively transforming the test signals.

11. The test method according to claim 10, wherein before the step of transforming the test signals, the method further comprises:
 decoding at least one of the pre-transformed test signals.

12. The test method according to claim 9, wherein the test signal is an analog signal, and the transformed test signal is a transistor-transistor logic signal.

13. The test method according to claim 9, wherein:
 the test device controls the communication unit to transmit the test result signal denoting failure to the electronic device if the transformed test signal does not conform the predetermined signal, and the test device controls the communication unit to transmit the test result signal denoting success to the electronic device if the transformed test signal conforms the predetermined signal.

14. The test method according to claim 9, wherein the test interfaces and the output interfaces respectively coupled to the test interfaces respectively supports one of video graphics array (VGA) interface standard, high definition multimedia interface (HDMI) standard, S-video standard, display port standard, Sony/Philips digital interface standard, and audio line out standard.

15. The test method according to claim 9, wherein the communication unit supports one of radio standard (RS-232) and universal serial bus (USB).

16. The test method according to claim 9, wherein the electronic device further determines whether to continue providing a test signal according to the test result signal.

* * * * *